J. H. LANE & C. D. HOUSE.

Improvement in Knitting-Machine Needles.

No. 5,091. Reissued Oct. 8, 1872.

*Witnesses.*
Chas Kenyon.
Edw P. Masi.

*Inventors.*
C. D. House
J. H. Lane
Chipman Hosmer & Co.
Attorneys

UNITED STATES PATENT OFFICE.

ORLANDO G. NEAL AND JOHN F. ADAMS, OF LAKE VILLAGE, NEW HAMPSHIRE, ASSIGNEES OF J. H. LANE AND C. D. HOUSE.

IMPROVEMENT IN KNITTING-MACHINE NEEDLES.

Specification forming part of Letters Patent No. 97,526, dated December 7, 1869; reissue No. 5,091, dated October 8, 1872.

*To all whom it may concern:*

Be it known that J. H. LANE and C. D. HOUSE, of Lake Village, in the county of Belknap and State of New Hampshire, have invented a new and useful Improvement in Knitting-Machine Needles; and we do hereby declare that the following is a full, clear, and exact description of the same, reference being had to the accompanying drawing and letters of reference marked thereon, making a part of this specification, in which—

Figure 1:
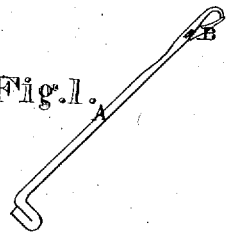
Figure 2:
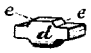
Figure 3:
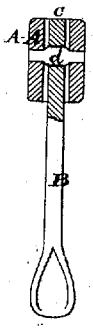

Figure 1 represents a side view of the improved needle; Fig. 2 is a perspective view of the rivet detached, enlarged; and Fig. 3 is an enlarged sectional view of the improved needle.

This invention relates to knitting-machine needles; and consists in a rivet-pin compressed or flattened at the ends, whereby a shoulder is formed at each side of the latch, thus keeping the latch in its proper position and preventing the rivet from escaping in either direction through the needle-wall.

The letter A of the drawing represents an ordinary knitting-machine needle; B, the latch thereof, secured between the walls of the slot *c* in the needle by the rivet *d*. This rivet is contracted on each side of the latch, thus forming shoulders, *e e*, which abut against the inner side of each wall of the slot *c*, and thereby prevent the longitudinal movement of the rivet in either direction. The rivet is not designed to turn with the latch.

It is apparent that when the walls of the slot are closed upon the shoulders of the rivet the latter is effectually secured and cannot work out in either direction; at the same time the shoulders prevent the walls of the slot from closing in upon and binding the latch.

What we claim as the invention of J. H. LANE and C. D. HOUSE, and desire to secure by Letters Patent, is—

A knitting-machine needle having its latch secured in place by a rivet which is provided with shoulders, against which the walls of slot abut, and by which they are prevented from closing upon and binding the latch so as to impede its free movement.

In testimony that we claim the above we have hereunto subscribed our names in the presence of two witnesses.

ORLANDO G. NEAL.
JOHN F. ADAMS.

Witnesses:
FREDERICK SMYTH,
GEO. E. GAGE.